United States Patent Office 3,174,937
Patented Mar. 23, 1965

3,174,937
COMPOUNDS, COMPOSITIONS AND PROCESSES
FOR PREPARING AND USING SAME
Albert F. Strobel, Delmar, and Sigmund C. Catino, Castleton, N.Y., assignors to General Aniline & Film Corporation, New York, N.Y., a corporation of Delaware
No Drawing. Filed Apr. 7, 1960, Ser. No. 20,539
13 Claims. (Cl. 252—300)

This invention relates to new and useful α-cyano-2-alkoxy-1-naphthalene acrylic amides and to processes for preparing same.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will cause them to spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency problem may not be paramount.

We have discovered a class of compounds which are not only compatible with a great number of film-forming plastics, resins, gums, waxes and the like, but which, further, exhibit outstanding ultra-violet absorbing properties within the generally encountered ultra-violet region of 250 to 400 millimicrons. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a further object of this invention to provide new and useful 2-alkoxy-α-cyano-1-naphthaleneacrylic amides.

It is a still further object of this invention to provide new and useful 2-alkoxy-α-cyano-1-naphthaleneacrylic amides exhibiting outstanding ultra-violet properties.

It is another object of this invention to provide processes for the preparation of new and useful ultra-violet absorbing compounds.

It is still another object of this invention to provide processes for the preparation of new and useful 2-alkoxy-α-cyano-1-naphthaleneacrylic amides.

Other objects and advantages will appear hereinafter as the description proceeds.

The new and useful compounds of this invention are characterized by the following general formula:

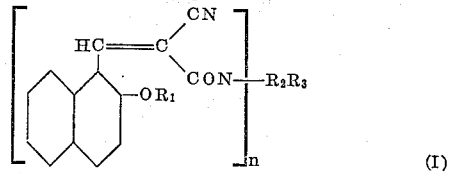

(I)

wherein $R_1$ is lower alkyl of from 1 to 9 carbon atoms as, for example, methyl, ethyl, n-propyl, isopropyl, n-butyl, isobutyl, tert. butyl, amyl, isoamyl, tert. amyl, hexyl, heptyl, octyl, nonyl, or $R_1$ is lower alkenyl of from 3 to 18 carbon atoms as, for example, propenyl, isopropenyl, allyl, 1-butenyl, 2-butenyl, 3-butenyl, 1-methylpropenyl, 1-pentenyl, 3-methyl-1-butenyl, hexenyl, heptenyl, octenyl, nonenyl, decenyl, undecenyl, oleyl, tetradecenyl, hexadecenyl, octadecenyl, and the like, $n$ is 1 or 2, and when $n$ is 1, $R_2$ and $R_3$ may be hydrogen, alkyl of from 1 to 18 carbon atoms, hydroxyalkyl, hydroxyalkoxyalkyl, alkoxyalkyl, cyanoalkyl, haloalkyl, aryl, substituted aryl, heterocyclic, or $R_2$ and $R_3$ may form a heterocyclic ring with the nitrogen atom, e.g., morpholino, and when $n$ is 2, $R_2$ is H and $R_3$ is $XR_4$ wherein X is alkylene or arylene and $R_4$ is Formula I devoid of $R_3$ to give compounds of the formula:

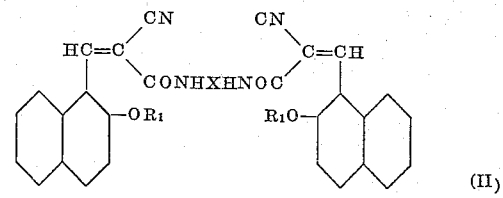

(II)

The following specific substituents for $R_2$, $R_3$ and X may be employed:

| | |
|---|---|
| Carboxytolyls | n-Amyl |
| Carboxyxylyls | iso-Amyl |
| Carbalkoxyphenyls, e.g., | Hexyl |
|    Carbomethoxyphenyl | Heptyl |
|    Carboethoxyphenyl | n-Octyl |
| Carbalkoxytolyls, e.g., | iso-Octyl |
|    Carbomethoxytolyls | Nonyl |
| Acetophenyl | Decyl |
| Propiophenyl | Undecyl |
| Butyrophenyl | Lauryl |
| Lauroylphenyl | Tetradecyl |
| p-Acetotolyl | Hexadecyl |
| Benzoyl naphthyl | Stearyl, and the like |
| Acetaminophenyl | Cyanoethyl |
| Acet-methylamino phenyl | Cyanopropyl(n) |
| Acetoaminotolyls | Cyanoisopropyl |
| Acetoaminonaphthyls | Cyanobutyl(n) |
| Propio-aminophenyl | Cyanoisobutyl |
| Propio-aminotolyls | Cyanoamyl(n) |
| Methyl | Cyanoisoamyl |
| Ethyl | Cyanohexyl |
| n-Propyl | Cyanoheptyl |
| iso-Propyl | Cyanononyl |
| n-Butyl | Cyanodecyl |
| iso-Butyl | Cyanolauryl, and the like. |

Hydroxyethyl
Hydroxypropyl (N-propyl, isopropyl)
Hydroxybutyl (N-butyl, isobutyl, etc.)
Hydroxyamyl
Hydroxyhexyl
Hydroxydecyl
Hydroxylauryl, and the like.
Chloroethyl
Chloropropyl (N-propyl, isopropyl)
Chlorobutyl (N-butyl, isobutyl, etc.)
Chloroamyl
Chlorohexyl
Chlorodecyl
Chlorolauryl, and the like.
Bromoethyl
Bromopropyl (N-propyl, isopropyl)
Bromobutyl (N-butyl, isobutyl, etc.)
Bromoamyl
Bromohexyl
Bromodecyl
Bromolauryl, and the like.
Methoxyethyl
Methoxypropyl (N-propyl, isopropyl)
Methoxybutyl (N-butyl, isobutyl, etc.)
Methoxyamyl
Methoxyhexyl
Methoxydecyl
Methoxylauryl, and the like.
Ethoxyethyl
Ethoxypropyl (N-propyl, isopropyl)
Ethoxybutyl (N-butyl, isobutyl, etc.)
Ethoxyamyl
Ethoxyhexyl
Ethoxydecyl
Ethoxylauryl, and the like.
Polyhydroxyalkyls, e.g., glyceryl
Heterocyclics
    Furyl
    Tetrahydrofurfuryl
    Benzofuryl
    Thienyl
    Pyrryl
    Pyrollidyl
    2-pyrollidonyl
    Indolyl
    Carbazolyl
    Oxazolyl
    Thiazolyl
    Pyrazolyl
    Pyridyl
    Pyrimidyl
    Quinolyl, and the various alkyl, alkoxy, halo, nitro, carboxy, carboxalkoxy, acyl, and acylamino derivatives of the aforementioned heterocyclic radicals
Aryls
    Phenyl
    α-Naphthyl, β-naphthyl
    α-anthracyl, β-anthracyl, γ-anthracyl
    Cumyl
    Phenanthranyl
    Anisole
    Phenetole
    Tolyl
    p-Diethoxyphenyl
    1-methoxy phenanthryl
    β-Naphthyl methyl ether
    β-Naphthyl ethyl ether
    Hydroxyethyl phenyl
    Hydroxypropyl phenyl
    p-Hydroxyethyl naphthyl
    Chlorophenyl
    Bromophenyl
    1,2-dichlorophenyl
    1,3-dichlorophenyl
    1,3,5-trichlorophenyl
    1,2-dibromophenyl
    o-Chlorotolyl
    m-Chlorotolyl
    m-Bromotolyl
    Bromo-o-xylyl
    α,β-Dichloro naphthyl
    4-bromoacenaphthyl
    Nitrophenyl
    o-Nitrotolyl
    p-Nitrotolyl
    4-nitroacenaphthyl
    3-nitrophenanthryl
    Carboxyphenyl In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. The resulting compounds have the following general formulae:

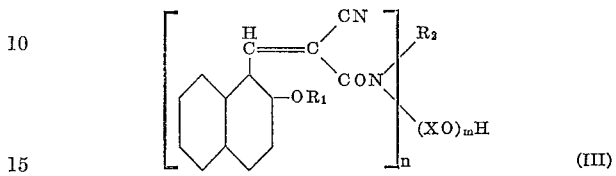

(III)

wherein $R_1$ and $R_2$ an $n$ are as designated above in Formula I, XO is the oxyalkylating agent (e.g., ethylene oxide) and $m$ is an integer from one to about 100 and represents the moles of oxyalkylating agent condensed with the amide compound, and

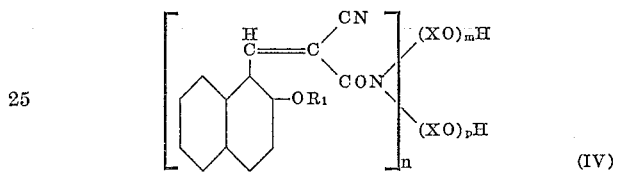

(IV)

wherein $R_1$ and $n$ are as above designated in Formula I, and $m$ and $p$ are integers from one to about 100.

*Example 1*

Preparation of:

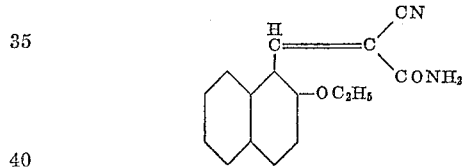

This compound is prepared by condensing 2-ethoxy-1-naphthaldehyde with cyanoacetamide as follows:

148 g. of 2-ethoxy-1-naphthaldehyde is stirred for 1 hour at 90° C. with 63 g. of cyanoacetamide and 1.70 g. of piperidine. After cooling to 60° C. the reaction mixture is diluted with 250 ml. of methanol and a slurry is produced. This slurry is filtered at 2° C. to separate the solid.

*Example 2*

The product of Example 1 is polyoxyalkylated with ethylene oxide by adding 4 moles thereof to 1 mole of amide in an autoclave at 80° C. 1% potassium hydroxide based on the weight of amide is also added. The resultant product has the formula:

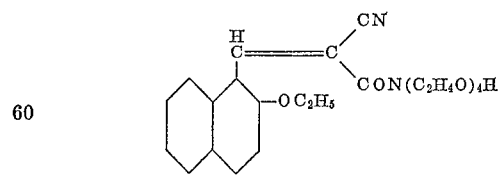

*Example 3*

Example 1 is repeated employing in lieu of 0.75 mole of cyanoacetamide, 0.75 mole of α-cyano-N,N-dimethylacetamide to yield a compound of the formula:

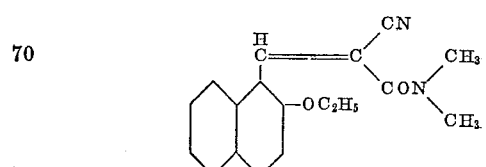

Example 4

Example 1 is again repeated employing, however, as the cyano compound, an equivalent weight of α-cyano-N,N-diethylacetamide.

Example 5

Example 1 is repeated employing, however, 2-methoxy-1-naphthaldehyde and cyanoacetamide in equivalent amounts.

Example 6

Example 5 is repeated employing α-cyano-N,N-diethylacetamide in equivalent amounts.

Example 7

Example 6 is repeated employing as the cyano compound, α-cyano-N-phenylacetamide in equivalent amounts to yield a compound of the formula:

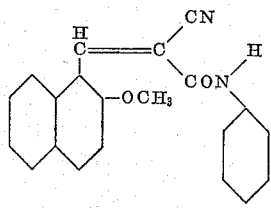

Example 8

The product of Example 7 is oxyalkylated as in Example 2 using 15 moles of ethylene oxide to give a water-soluble product containing 15 oxyethyl groups.

Example 9

Example 8 is repeated employing 40 moles of ethylene oxide to yield a product of the formula:

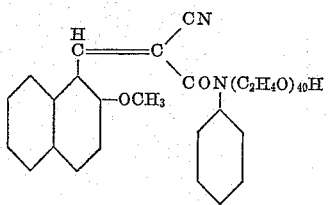

Example 10

The product of Example 2 is further treated with 10 moles of propylene oxide to yield:

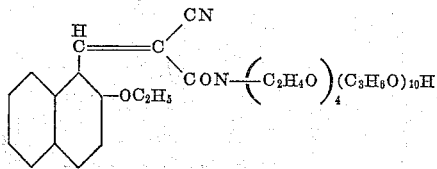

Example 11

The product of Example 7 is oxypropylated using 10 moles of propylene oxide and then oxyethylated with 15 moles of ethylene oxide to yield:

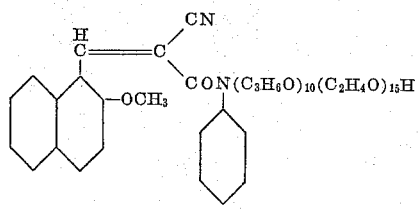

It is to be noted that the nitrogen substituents of Examples 2, 8, 9, 10 and 11 may be characterized as hydroxyalkoxyalkyl.

Example 12

Example 1 is repeated except that in place of 63 g. of cyanoacetamide, there is used 0.75 m. of N,N'-bis(cyanoacetyl) ethylene diamine:

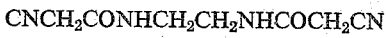

which is prepared from cyanoacetic acid and ethylene diamine. The resultant bis compound has the formula:

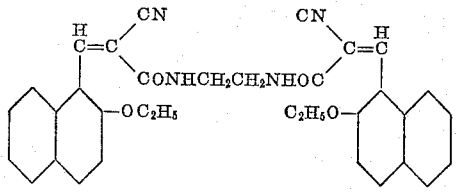

Example 13

Example 12 is repeated using, however, 0.75 m. of N,N'-bis(cyanoacetyl)pentamethylenediamine in place of the ethylenediamine compound of that example.

Example 14

Example 12 is again repeated using 0.75 m. of N,N'-p-phenylene biscyanoacetamide (which is prepared by condensing 1 mole p-phenylenediamine with 2 moles cyanoacetic acid) in place of the ethylenediamine of that example. The biscyanoacetamide is prepared as follows: 170 g. of cyanoacetic acid is mixed with 108 g. of p-phenylenediamine, 400 mls. of chloroform and 5 grams of a mixed alkane sulfonic acid catalyst in a 1.5 liter flask equipped with a condenser and water separator. The mixture is heated at reflux until no more water is taken off. The product is washed with 20% sodium hydroxide and then with water until neutral. It is then extracted with chloroform, dried and the solvent removed.

Example 15

0.37 mole of 2-allyloxy-1-naphthaldehyde is condensed with 0.37 mole of α-cyanoacetamide in the presence of 0.01 mole piperidine at 95° C. for 80 minutes. After cooling to 60° C., 120 mls. of methanol are added and a slurry results. The slurry is filtered, and the filter cake washed with methanol and air dried.

The intermediate aldehyde is prepared in the manner described in copending application Serial No. 13,712, filed March 9, 1960.

Example 16

Example 12 is repeated using, however, the aldehyde of Example 15 in equivalent amounts.

The compounds of this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water in the case of oxyethylene groups, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein.

Of particularly outstanding significance is the use of the compounds herein described in combination with high molecular weight polymers of formaldehyde such as Delrin. The incorporation of from 1 to 5% of the compounds of this invention in such polymers yields an outstanding improvement in the stability of the polymer. It has been determined that at least about a five-fold improvement in stability as manifested by a decrease in crazing and surface cracks is obtained when tested for 30 days in a standard weatherometer. The compounds of this invention may be incorporated in the finished polymer or preferably in the polymerizing mass. Other stabilizers such as the benzothiazoles and the benzophenones cannot be used in this manner since they cause depolymerization.

Another outstanding use of the compounds of this invention lies in the employment thereof in the transparent backings of pressure-sensitive tapes whereby the adhesive is protected against the degradative affects of the environment and particularly of the active radiations. In such use, the compounds may be added to the plastic backing material in the manufacture thereof or impregnated or coated thereon or therein.

Other variations in and modifications of the described processes which will be obvious to those skilled in the art can be made in this invention without departing from the scope or spirit thereof.

We claim:
1. A compound of the formula:

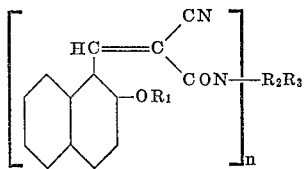

wherein $R_1$ is a radical selected from the group consisting of lower alkyl of from 1 to 9 carbon atoms and alkenyl of from 3 to 18 carbon atoms, $n$ is an integer from 1 to 2 and when $n$ is 1, $R_2$ and $R_3$ are radicals selected from the group consisting of hydrogen, alkyl, hydroxyalkyl, hydroxy alkoxyalkyl, alkoxyalkyl, cyanoalkyl, haloalkyl, and aryl radicals, and when $n$ is 2, $R_2$ is H and $R_3$ is a radical selected from the group consisting of alkylene and arylene radicals.

2. A compound as defined in claim 1 wherein $n$ is 1, $R_1$ is alkyl and $R_2$ and $R_3$ are hydrogen.
3. A compound as defined in claim 1 wherein $n$ is 1, $R_1$ is alkyl and $R_2$ and $R_3$ are alkyl.
4. A compound as defined in claim 1 wherein $n$ is 1, $R_1$ is alkenyl and $R_2$ and $R_3$ are hydrogen.
5. A compound as defined in claim 1 wherein $n$ is 1, $R_1$ is alkyl and $R_2$ and $R_3$ are hydroxyalkoxy alkyl.
6. A compound as defined in claim 1 wherein $n$ is 2, $R_1$ is alkyl, $R_2$ is hydrogen and $R_3$ is alkylene.

7. A compound as defined in claim 1 wherein $n$ is 2, $R_1$ is alkyl, $R_2$ is hydrogen and $R_3$ is arylene.
8. A compound as defined in claim 1 wherein $n$ is 1, $R_1$ is ethyl and $R_2$ and $R_3$ are hydrogen.
9. A compound as defined in claim 1 wherein $n$ is 1, $R_1$ is ethyl and $R_2$ and $R_3$ are methyl.
10. A compound as defined in claim 1 wherein $n$ is 1, $R_1$ is methyl, $R_2$ is hydrogen and $R_3$ is phenyl.
11. A compound as defined in claim 1 wherein $n$ is 2, $R_1$ is ethyl, $R_2$ is hydrogen and $R_3$ is ethylene.
12. An ultra-violet absorbing composition comprising an organic material susceptible to ultra-violet light degradation and as a stabilizer therefor and absorber for ultra-violet radiation a compound of the formula:

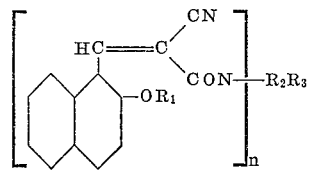

wherein $R_1$ is a radical selected from the group consisting of lower alkyl of from 1 to 9 carbon atoms and alkenyl of from 3 to 18 carbon atoms, $n$ is an integer from 1 to 2 and when $n$ is 1, $R_2$ and $R_3$ are radicals selected from the group consisting of hydrogen, alkyl, hydroxyalkyl, hydroxy alkoxyalkyl, alkoxyalkyl, cyanoalkyl, haloalkyl, and aryl radicals, and when $n$ is 2, $R_2$ is H and $R_3$ is a radical selected from the group consisting of alkylene and arylene radicals.

13. An ultra-violet absorbing composition comprising an organic material susceptible to ultra-violet light degradation and as a stabilizer therefor and absorber for ultra-violet radiation from about 0.1 to about 10% based on the weight of said organic material, of a compound of the formula:

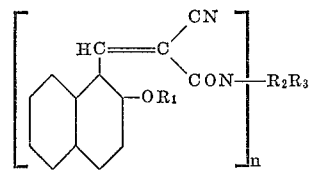

wherein $R_1$ is a radical selected from the group consisting of lower alkyl of from 1 to 9 carbon atoms and alkenyl of from 3 to 18 carbon atoms, $n$ is an integer from 1 to 2 and when $n$ is 1, $R_2$ and $R_3$ are radicals selected from the group consisting of hydrogen, alkyl, hydroxyalkyl, hydroxy alkoxyalkyl, alkoxyalkyl, cyanoalkyl, haloalkyl, and aryl radicals, and when $n$ is 2, $R_2$ is H and $R_3$ is a radical selected from the group consisting of alkylene and arylene radicals.

References Cited by the Examiner
UNITED STATES PATENTS

| | | | |
|---|---|---|---|
| 2,465,318 | 7/43 | Seymour | 260—465 |
| 2,794,788 | 6/57 | Coover et al. | 260—465 |
| 2,914,551 | 11/59 | Kartinos et al. | 260—45.56 |
| 3,010,938 | 11/61 | Spacht | 260—45.9 |

OTHER REFERENCES

Curtis et al., J. Chem. Soc. (London, vol. 123, pages 3130–40) (1923).

LEON J. BERCOVITZ, *Primary Examiner.*

A. M. BOETTCHER, MILTON STERMAN, *Examiners.*